Figure 2:
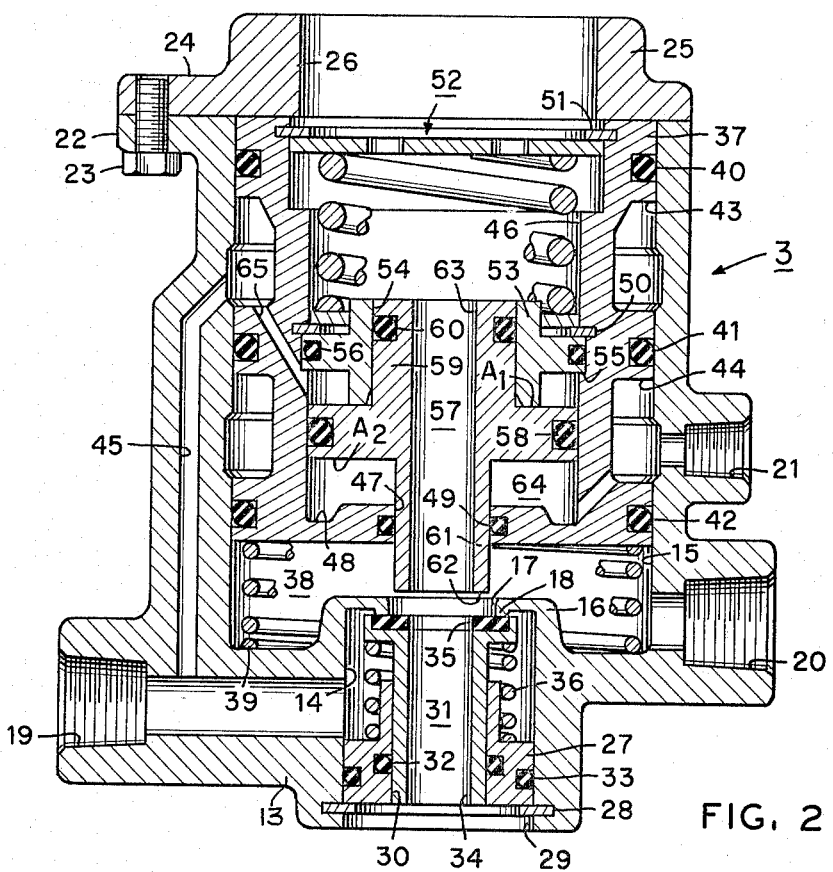

Nov. 8, 1966     R. C. BUELER     3,284,142
CONTROL VALVE
Original Filed Sept. 10, 1964

INVENTOR
RICHARD C. BUELER
BY
Joseph E. Papin

United States Patent Office 3,284,142
Patented Nov. 8, 1966

3,284,142
CONTROL VALVE
Richard C. Bueler, Glendale, Mo., assignor to Wagner Electric Corporation, St. Louis, Mo., a corporation of Delaware
Continuation of application Ser. No. 395,434, Sept. 10, 1964. This application Mar. 28, 1966, Ser. No. 538,105
17 Claims. (Cl. 303—13)

This invention relates to fluid pressure systems and in particular to control valves therefor having emergency means therein for automatically actuating said systems.

In past fluid pressure systems, particularly those related to vehicle braking, various emergency devices have been employed to effect emergency braking of the vehicle in the event of malfunction of said systems effecting loss of fluid pressure therein, and the usual emergency control means were incorporated in said fluid pressure systems in the form of separate independent valves, such as the well-known emergency valve or the relay emergency valve. One of the undesirable features of the past systems was that a separate emergency valve was compatibly employed in said systems along with the other necessary valving therein to effect the emergency function, and, of course, it is apparent that such separate valving manifestly increased the initial cost of said systems as well as the maintenance or cost of upkeep therefor. Another undesirable or disadvantageous feature of the use of a separate emergency valve in a fluid pressure system was particularly evident in the past tractor-trailer braking systems wherein the emergency valve when actuated due to low pressure in said systems effected energization of only the trailer brakes; however, it would have been more desirable to have also effected energization of the tractor brakes in order to obtain maximum braking effort for such tractor-trailer braking systems under such low pressure or emergency conditions. In conjunction with the aforementioned undesirable feature of the past tractor-trailer braking systems, another undesirable feature was the inability of the operator to actuate the tractor brakes in the event the treadle or treadle linkage to the system application valve was lost, disengaged, broken, or for some other reason became inoperable to effect actuation of said application valve. Still another undesirable or disadvantageous feature in the past tractor-trailer fluid pressure systems utilizing a separate emergency valve was that premature tractor movement was not obviated until sufficient operating pressure was attained in the system pressure reservoir, such as encountered in moving a tractor which had been parked for a period of time.

The object of the present invention is to provide a novel fluid pressure system and novel control valve means therefor which obviates the aforementioned undesirable or disadvantageous features, and this and other objects and advantageous features of the present invention will become apparent hereinafter.

Briefly, the invention embodies a fluid pressure system having a pair of fluid pressure sources and a fluid pressure responsive motor and also control means for normally effecting the application of fluid pressure from one of said sources to said motor including means responsive to a predetermined fluid pressure differential between said source to automatically effect the application of fluid pressure from said one source to said motor.

Figure 1:
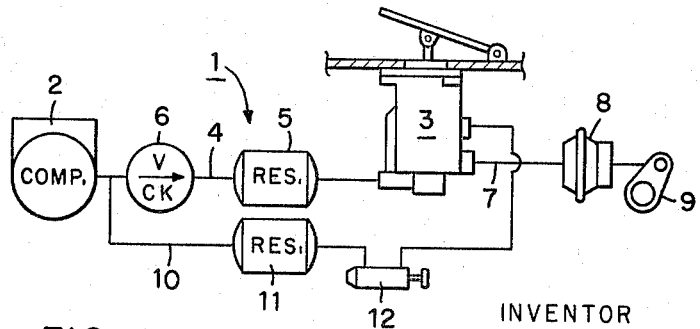

In the drawings which illustrate embodiments of the invention,

FIG. 1 is a diagrammatic view of a fluid pressure system having control means therein embodying the present invention, and FIG. 2 is a greatly enlarged cross-sectional view of the control valve means of FIG. 1.

Referring now to the drawings in detail and in particular to FIG. 1, a fluid pressure system 1 is shown having fluid pressure generating means, such as a compressor 2, connected with the inlet port of a control or application valve 3 by a conduit 4 having a reservoir 5 interposed therein, and a check valve 6 is provided in said conduit to provide uni-directional pressure fluid flow from said compressor to said reservoir. Another conduit 7 is connected between the outlet port of the control valve 3 and a fluid pressure responsive motor or brake chamber 8 which is operatively connected with linkage means, such as slack adjustor 9, for controlling the energization of a friction device (not shown). Another conduit 10 has one end connected with the emergency or control port of the control valve 3 and the other end thereof intersecting with the conduit 4 between the compressor 2 and check valve 6, and a system or main reservoir 11 is interposed in the conduit 10. To complete the description of the system 1, a push-pull hand valve 12 of the type well known in the art is interposed in the conduit 10 between the reservoir 11 and the control valve 3, said push-pull valve 12 being manually operable between a venting position which interrupts pressure fluid communication between the reservoir 11 and the emergency port of said control valve and exhausts said emergency port to the atmosphere and a charging position connecting said emergency port in pressure fluid communication with the reservoir 11.

The control valve 3, FIG. 2, is provided with a housing 13 having a bore 14 therein, which forms an inlet chamber, and a counterbore 15 in axial alignment with said bore. A radially extending wall 16 is integrally formed with the housing 13 between the bore 14 and counterbore 15, and a connecting passage 17 extends through said wall between said bore and counterbore, said wall having a valve seat 18 thereon in circumscribing relation with said connecting passage. Inlet and outlet ports 19 and 20, which respectively receive conduits 4 and 7, as previously mentioned, are provided in the housing 13 connecting with the bore 14 and counterbore 15, respectively, and a control or emergency port 21 which receives the conduit 10, as previously mentioned, is also provided in said housing connecting with the counterbore 15 adjacent the midportion thereof. A plurality of mounting flanges 22 are provided adjacent to the upper end of the housing 13 and are fixedly connected by suitable means, such as studs 23, with like mounting flanges 24 provided on a closure member 25 for the upper end of the counterbore 15, said closure member having a guide opening 26 therethrough to receive the force transmitting linkage of an operator controlled lever (not shown).

A valve guide member 27 is positioned in the bore 14 against displacement by a snap ring and groove assembly 28 provided adjacent to the lower end of said bore, said lower end of said bore forming an exhaust port 29. The valve guide member 27 is provided with an axial valve bore 30 in which a valve element 31 is slidably received, and seals 32, 33 are carried in said valve guide member in sealing engagement with said valve element and the housing bore 14, respectively. The valve element 31 is provided with an axial exhaust passage 34 therethrough, and an annular resilient seal or disc 35 is provided on the upper end of said valve element in circumscribing relation with said exhaust passage. A valve spring 36 biased between the valve guide member 27 and the valve element 31 normally urges the valve element seal 35 into sealing engagement with the valve seat 18 provided on the housing wall 16 to normally interrupt pressure fluid communication through the connecting passage 17 between the inlet and outlet ports 19, 20 while establishing pressure fluid communication between said outlet port and the exhaust port 29 through said connecting passage and the valve element exhaust opening 34.

An application member or reaction piston 37 is slidably received in the counterbore 15 defining therein with the housing wall 16 an outlet chamber 38 connected in open pressure fluid communication with the outlet port 20 at all times, and a return spring 39 is positioned in said outlet chamber between said reaction piston and said housing wall normally urging the upper end of said reaction piston toward abutting engagement with the counterbore closure member 25. Spaced seals 40, 41, 42 are provided in the peripheral portion of the reaction piston 37 in sealing engagement with the counterbore 15, and peripheral grooves 43, 44 are also provided in said reaction piston between seals 40, 41 and seals 41, 42, respectively. The peripheral groove 44 is in open pressure fluid communication with the control port 21 at all times, and passage means 45 is provided in said housing having one end connecting with the inlet port 19 and the other end thereof connecting with the counterbore 15 in open pressure fluid communication with the peripheral groove 43 of the reaction piston 37 at all times. A pair of stepped bores 46, 47 are axially provided through the reaction piston 37 having a shoulder 48 formed therebetween, and a seal 49 is disposed in the stepped bore 47. Snap ring and groove assemblies 50, 51 are respectively provided adjacent the mid-portion and upper end of the reaction piston bore 46, and a pre-compressed metering spring and retainer assembly, indicated generally at 52, is slidably contained within said reaction piston bore in abutting engagement with the snap rings 50, 51.

A piston guide and retainer member 53 having a bore 54 extending axially therethrough is fixedly positioned in the reaction piston bore 46 in abutting engagement between the snap ring 50 and a shoulder 55 provided in said reaction piston bore, and a seal 56 is carried in the peripheral portion of said piston guide and retainer member in sealing engagement with said reaction piston bore. An application member or control piston 57 is slidably received in the reaction piston bore 46 between the piston guide member 53 and the reaction piston shoulder 48, and a seal 58 is provided in the peripheral portion of said control piston in sealing engagement with said reaction piston bore. The control piston 57 is provided with an integral upper extension 59 slidable in the bore 54 of the piston guide member 53, and a seal 60 is carried in the periphery of said upper extension in sealing engagement with said bore. A lower extension 61 having a diameter less than the upper extension 60 is also integrally provided on the control piston 57 being slidably received in the reaction piston bore 47 in sealing engagement with the seal 49 therein, and the lower or free end of said lower extension extends into the outlet chamber 38 defining a valve seat 62 for operative engagement with the valve element 31. An auxiliary exhaust opening or passage 63 extends coaxially through the valve seat 62, the control piston 57 and the upper and lower extensions 59 and 61 thereof, providing another path for venting the outlet chamber 38 to the atmosphere through the reaction piston bore 46.

A fluid pressure control chamber 64 is defined within the reaction piston bore 46 between the control piston 57 and the reaction piston shoulder 48, and a passage 65 in the reaction piston 37 connects said chamber in open pressure fluid communication with the reaction piston peripheral groove 44 and the control port 21 at all times. Another fluid pressure control chamber 66 is defined within the reaction piston bore 46 in opposition to the chamber 64 between the control piston 57 and the piston guide member 53, and another passage 67 in the reaction piston 37 connects said chamber in open pressure fluid communication with the reaction piston peripheral groove 43, the passage 45 and the inlet port 19 at all times. To complete the description of the control valve 3, the control piston 57 is provided with an annular shoulder or surface $A_1$ having an effective area responsive to fluid pressure in the chamber 66 and an opposing annular shoulder or surface $A_2$ having an effective area greater than that of the shoulder $A_1$ and responsive to fluid pressure in the chamber 64.

Under normal operating conditions with the hand valve 12 in the charging position thereof to effect open pressure fluid communication between the reservoir 11 and the control port 21 of the control valve 3, fluid pressure generated by the compressor 2 flows through the conduits 4 and 10, the reservoir 11, and said push-pull valve into said control port and therefrom through the reaction piston peripheral groove 44 and passage 65 into the control chamber 64. Such fluid pressure generated by the compressor 2 also flows through the conduit 4, the uni-directional valve 6, the reservoir 5 into the inlet port 19 of the control valve 3 and therefrom into the inlet chamber 14 and also through the housing passage 45, the reaction piston peripheral groove 43 and passage 67 into the control chamber 66. Assuming that the generated fluid pressure so established in the reservoirs 5, 11 and in the control chambers 64, 66 under normal operating conditions is substantially equal, the fluid pressure in the control chamber 64 acting on the larger effective area $A_2$ of the control piston 57 establishes a force $F_2$ which serves to move said control piston upwardly in the reaction piston bore 46 to its retracted or inoperative position in abutting engagement with the piston guide member 53 against a lesser opposing force $F_1$ established by the fluid pressure in the chamber 66 acting on the smaller opposing effective area $A_1$ of said control piston 57. It is apparent that the reservoir 5 is a protected reservoir since the uni-directional valve 6 protects said reservoir against loss of fluid pressure therefrom due to a malfunctioning compressor and/or leaks in the system 1 ahead of the reservoir 5. With substantially equal fluid pressure so established in the reservoirs 5, 11 and the control chambers 64, 66 of the control valve 3, the component parts of said control valve are now positioned as shown in the drawings, and it is apparent that the control piston 57, in the retracted position thereof, is engaged for concert movement with the reaction piston 37.

If the operator desires to effect a braking application under normal operating conditions, a manually applied force on the metering spring and retainer assembly 52 effects concert movement of the reaction piston 37 and the control piston 57 downwardly against the compressive force of the return spring 39 to engage the valve seat 62 on the control piston extension 61 with the valve element 31 to close the valve element exhaust opening 34 and the control piston auxiliary exhaust passage 63 and interrupt pressure fluid communication between the outlet and exhaust ports 20 and 29. Further concert downward movement of the reaction and control pistons 37 and 57 serves to disengage the valve element 31 from the valve seat 18 on the housing wall 16 to open the connecting passage 17 and establish pressure fluid communication between the inlet and outlet ports 19 and 20. In this manner, pressure fluid flows from the reservoir 5 through the conduit 4, the inlet port and chamber 19 and 14, the connecting passage 17, the outlet chamber and port 38 and 20, and therefrom through the conduit 7 to actuate the brake chamber 8 which, in turn, rotates the slack adjustor 9 to energize the wheel brake assembly associated therewith (not shown).

When the reaction force of the fluid pressure in the outlet chamber 38 acting on the effective area of the reaction piston 37 therein is substantially equal to the applied force, the reaction and control pistons 37 and 57 are concertly moved upwardly against the compressive force of the metering spring 52 wherein the valve element 31 is positioned in lapped engagement with the housing valve seat 18, and the valve seat 62 on the control piston extension 61 is positioned in lapped engagement with said valve element. If a greater braking effort is desired, a manually applied force is increased, and the component parts of the control valve 3 function in the same manner as previously described to again move said component parts to their lapped positions.

When the desired braking effort is attained, the manually applied force is removed from the reaction piston 37 wherein the compressive force of the return spring 39 and the reaction force on said reaction piston serve to move said reaction piston upwardly toward its original or inoperative position, and the valve spring 36 returns the valve element 31 into sealing engagement with the housing valve seat 18. Initially, this upward movement sealably re-engages valve element 31 with the housing valve seat 18 to again interrupt pressure fluid communication between the inlet and outlet ports 19 and 20, and further upward movement of the reaction piston 37 disengages the valve seat 62 on the control piston extension 61 from said valve element to re-establish pressure fluid communication between the outlet and exhaust ports 20 and 29 and effect de-energization of the wheel brake assembly by exhausting the established fluid pressure to the atmosphere from the brake chamber 8 through the conduit 7, the outlet port and chamber 20 and 38, the connecting passage 17, the valve element exhaust passage 34, and the exhaust port 29.

Under emergency conditions when the fluid pressure in the reservoir 11 is reduced or lost due to a malfunctioning compressor and/or leaks in the system 1 or the like, the fluid pressure in the control chamber 64 is correspondingly reduced, which effects a similar reduction in the force $F_2$ acting on the control piston 57. When a predetermined ratio is effected between the respective fluid pressures in chambers 64 and 66 by such reduction of fluid pressure in the chamber 64, the opposing force $F_1$ acting on the control piston 57 overcomes the reduced force $F_2$ and serves to move said control piston downwardly in the reaction piston bore 46 relative to the reaction piston 37 toward a protracted position to engage the valve seat 62 on the control piston extension 61 with the valve element 31 and effect automatic actuation of said valve element under such emergency or low pressure conditions. This emergency actuation of the valve element 31 by the control piston 57 initially interrupts pressure fluid communication between the outlet and exhaust ports 20 and 29 and thereafter establishes pressure fluid communication between the inlet and outlet ports 19 and 20 to effect emergency energization of the wheel brake assembly (not shown), as described hereinbefore, under such emergency conditions. Upon the re-establishment of the fluid pressure in the reservoir 11 and the control chamber 64 to a magnitude such that the force $F_2$ once again exceeds the force $F_1$, the force $F_2$ serves to move said control piston from the protracted position thereof in opposition to the force $F_1$, and in this manner, the valve element 31 is again positioned to interrupt pressure fluid communication between the inlet and outlet ports 19 and 20 and establish pressure fluid communication between the outlet and exhaust ports 20 and 29.

In the event that the operator treadle or treadle linkage (not shown) is lost, broken, disengaged from the control valve 3, or for some other reasons becomes inoperable for transmitting the applied force to the reaction piston 37, the operator can manually actuate the system 1 to effect or simulate emergency operating conditions by manually moving the push-pull valve 12 to the venting position thereof to interrupt pressure fluid communication between the reservoir 11 and the emergency port 21 of the control valve 3 and exhaust said emergency port to the atmosphere. When the system 1 is manually actuated in this maner to simulate the emergency condition, pressure fluid in the chamber 64 is vented to the atmosphere through the reaction piston passage and peripheral groove 65 and 44, the emergency port 21 and the conduit 10 to the push-pull valve 12. Exhaustion of the fluid pressure from the control chamber 64 eliminates the force $F_2$ acting on the control piston 57 thereby permitting the opposing force $F_2$ to move said control piston from the retracted position thereof relative to the reaction piston 37 toward the protracted position thereof and effect automatic actuation of the valve element 31, as described hereinbefore, along with the resulting energization of the wheel brake assembly (not shown).

From the foregoing, it is now apparent that a novel system and control valve meeting the objects and advantages set out hereinbefore are provided and that changes or modifications to the precise configurations, shapes or details of the constructions set forth in the disclosure by way of illustration may be made by those skilled in the art without departing from the spirit of the invention as defined by the claims which follow.

The embodiments of the invention in which an exclusive property or privilege is claimed are defined as follows:

1. A control valve comprising a housing, and application means movable in said housing and defining with said housing a pressure fluid flow passage therethrough, said application means being movable in response to an applied force toward a position in said flow passage establishing pressure fluid flow therethrough, said application means including a pair of opposed fluid pressure chambers, and other means movable between said chambers, said other means being automatically movable in response to a ratio between the fluid pressures in said chambers less than a predetermined value toward a position in said flow passage establishing pressure fluid flow therethrough.

2. The control valve according to claim 1, comprising opposed fluid pressure responsive surfaces on said other means respectively responsive to fluid pressure in said chambers and having effective areas in a ratio substantially equal to the predetermined value.

3. The control valve according to claim 1, wherein said application means also includes a member movable in said housing, said other means being concertedly and relatively movable in said member and defining therewith said chambers, and said other means being protractively and retractively movable relative to said member between a protracted position for automatically establishing pressure fluid flow through said flow passage and a retracted position for concerted applied force movement with said member to establish pressure fluid flow through said flow passage when the ratio between the fluid pressures in said chambers is less than the predetermined value and when the ratio between the fluid pressures in said chambers exceeds the predetermined value, respectively.

4. The control valve according to claim 3, comprising extension means on said other means extending through said member into said flow passage to control the pressure fluid flow therethrough, said extension means being movable toward a position in said flow passage establishing the pressure fluid flow therethrough in response to both the concerted applied force movement of said member and other means and the automatic movement of said other means.

5. The control valve according to claim 4, comprising opposed areas on said other means and in said chambers, respectively, the opposed area in one of said chambers being greater than the opposed area in the other of said chambers, said other means and extension means being automatically movable to establish the pressure fluid flow through said flow passage when the ratio between the fluid pressure in said other chamber acting on the area therein and the fluid pressure in said other chamber acting on the area therein is less than the predetermined value.

6. The control valve according to claim 1, comprising selectively operable means connected with one of said chambers and movable between one position for subjecting said one chamber to fluid pressure and another position venting said one chamber to the atmosphere, the applied force movement of said application means and the automatic movement of said other means respectively establishing the pressure fluid flow through said flow passage when said selectively operable means is in the one position thereof, and said other means also being automatically movable to establish the pressure fluid flow through said flow passage when said selectively operable means is moved to the other position thereof.

7. A control valve comprising a housing having inlet and outlet ports therein, valve means controlling pressure fluid communication between said inlet and outlet ports, and valve control means movable in said housing in response to an applied force to engage and move said valve means toward a position establishing pressure fluid communication between said inlet and outlet ports, said valve control means including a pair of opposed fluid pressure chambers, and other means movable between said chambers, said other means being movable in response to a ratio between the fluid pressures in said chambers less than a predetermined value to actuate said valve means.

8. A control valve comprising a housing having inlet, outlet and a pair of control ports therein, valve means controlling pressure fluid communication between said inlet and outlet ports, valve control means movable in said housing including a pair of opposed expansible fluid pressure chambers, and other means movable between said chambers, said valve control means being movable in response to an applied force to engage and move said valve means toward a position establishing pressure fluid communication between said inlet and outlet ports, and means within said housing including said valve control means defining a pair of passage means respectively connecting said control ports in pressure fluid communication with said chambers, said other means being automatically movable in response to a ratio between the respective fluid pressures at said control ports less than a predetermined value to engage and actuate said valve means.

9. The control valve according to claim 8, comprising opposed fluid pressure responsive surfaces on said other means respectively responsive to fluid pressures at said control port and having effective areas substantially equal to the predetermined value.

10. The control valve according to claim 8, wherein said valve control means also includes a member movable in said housing in response to the applied force, said other means being concertedly and relatively movable in said member and defining therewith said chambers, and said other means being protractively and retractively movable relative to said member between a protracted position for automatically actuating said valve means and a retracted position for concerted applied force movement with said member when the ratio between the fluid pressures at said control ports is less than the predetermined value and when the ratio between the fluid pressures at said control ports exceeds the predetermined value, respectively.

11. The control valve according to claim 10, wherein said other means includes extension means movable in said member and having a free end portion for operative engagement with said valve means, said extension means being movable upon the applied force movement of said member and other means and also upon the automatic movement of said other means to engage said free end portion with said valve means to effect actuation thereof.

12. The control valve according to claim 8, wherein said pair of passage means comprise a pair of spaced groove means in said valve control means in open pressure fluid communication with said control ports at all times, and a pair of passages in said valve control means, said passages having one of their ends connected with said chambers and the other of their ends connected with said groove means, respectively.

13. The control valve according to claim 10, a pair of spaced abutment means on said member defining the protracted and retracted positions of said other means, said other means being movable between said abutment means, said other means being urged toward engagement with one of said abutment means in the retracted position thereof when the ratio between the fluid pressures at said control ports exceeds the predetermined value and being urged toward engagement with the other of said abutment means in the protracted position thereof when the ratio between the fluid pressures at said control ports is less than the predetermined value.

14. The control valve according to claim 8, comprising an inlet chamber in said housing connected with said inlet port, said valve control means defining with said housing an outlet chamber connected with said outlet port, a connecting passage in said housing between said inlet and outlet chambers, a valve seat on said housing in circumscribing relation with said connecting passage, said valve means being normally urged into engagement with said valve seat closing said connecting passage, the applied force movement of said valve control means and also the automatic movement of said other means serving to actuate said valve means to a position disengaged from said valve seat and opening said connecting passage.

15. The control valve according to claim 8, comprising a bore and counterbore in said housing, said inlet port being connected with said bore, wall means between said bore and counterbore, a connecting passage in said wall means between said bore and counterbore, a valve seat on said wall means in circumscribing relation with said connecting passage, said valve means being normally urged into engagement with said valve seat closing said connecting passage and interrupting pressure fluid communication between said inlet and outlet ports, said outlet port being connected with said counterbore adjacent to said wall means, one of said control ports being connected with said counterbore between said outlet port and the end of said counterbore opposite said wall means, the other of said control ports being connected with said counterbore between said one control port and the end of said counterbore opposite said wall means, said valve control means also including piston means slidable in said counterbore between said outlet port and the end of said counterbore opposite said wall means, said pair of passage means including a pair of spaced peripheral recess means in said piston means respectively connected in open pressure fluid communication with said control ports, and a pair of passages in said piston means respectively connected between said recess means and said chambers, stepped bores in said piston means, said other means including stepped piston means slidable in said stepped bores and defining in the larger of said stepped bores said opposed chambers, and said stepped piston means including a free end portion extending through the smaller of said stepped bores and defining another valve seat for operative engagement with said valve means, the applied force movement of said valve control means and also the automatic movement of said other means serving to engage said other valve seat with said valve means and thereafter actuate said valve means to a position disengaged from said first named valve seat to open said connecting passage and establish the pressure fluid communication between said inlet and outlet ports.

16. The control valve according to claim 10, comprising a bore and counterbore in said member, said other means including piston means movable in said counterbore and defining therein said opposed chambers, and extension means extending through one of said chambers and said bore and having a free end defining a valve seat for operative engagement with said valve means, the applied force movement of said member and other means and also the automatic movement of said other means serving to engage said valve seat with said valve means and thereafter effect actuation thereof.

17. The control valve according to claim 8, comprising selectively operable means connected with one of said control ports and movable between one position for subjecting said one control port to fluid pressure and another position venting the fluid pressure at said one control port to the atmosphere, the applied force movement of said valve control means and the automatic movement of said other means actuating said valve means to establish fluid pressure at said outlet port when said selectively operable means is in the one position thereof, and said other means also being automatically movable to actuate said valve means and establish fluid pressure at said outlet port when said selectively operable means is moved to the other position thereof.

No references cited.

EUGENE G. BOTZ, *Primary Examiner*.